United States Patent
Rozsypal et al.

(10) Patent No.: US 7,564,704 B2
(45) Date of Patent: Jul. 21, 2009

(54) METHOD OF FORMING A POWER SUPPLY CONTROLLER AND STRUCTURE THEREFOR

(75) Inventors: Antonin Rozsypal, Hutisko-Solanec (CZ); Roman Stuler, Karolinka (CZ); Karel Ptacek, Roznov Pod Radh (CZ)

(73) Assignee: Semiconductor Components Industries, L.L.C., Phoenix, AZ (US)

( * ) Notice: Subject to any disclaimer, the term of this patent is extended or adjusted under 35 U.S.C. 154(b) by 323 days.

(21) Appl. No.: 11/566,891

(22) Filed: Dec. 5, 2006

(65) Prior Publication Data
US 2008/0129269 A1 Jun. 5, 2008

(51) Int. Cl.
*H02H 7/122* (2006.01)
*H02M 3/335* (2006.01)
*H02M 3/28* (2006.01)
(52) U.S. Cl. .................. 363/56.1; 363/21.03; 363/97
(58) Field of Classification Search ............. 363/17–20, 363/21.02, 21.03, 56.04, 56.1, 97
See application file for complete search history.

(56) References Cited

U.S. PATENT DOCUMENTS

| 6,097,075 | A | 8/2000 | Rozsypal et al. |
| 6,614,288 | B1* | 9/2003 | Dagan et al. ............... 327/365 |
| 6,943,069 | B2* | 9/2005 | Halamik et al. ............ 438/186 |

OTHER PUBLICATIONS

Data Sheet, "AND8244, A 36 W Ballast Application With the NCP5181", Semiconductor Components Industries LLC, Copyright 2005, Nov. 2005—Rev. 0, 6 pages.
Data Sheet, "NCP1395A/B High Performance Resonant Mode Controller", Semiconductor Components Industries, LLC., Copyright 2006, Mar. 2006-Rev. 1, 27 pages.
Data Sheet, "NCP5181 High Voltage High and Low Side Driver", Semiconductor Components Industries, LLC., Copyright 2006, Mar. 2006—Rev. 2, 12 pages.

* cited by examiner

*Primary Examiner*—Jeffrey L Sterrett
*Assistant Examiner*—Fred E Finch, III
(74) *Attorney, Agent, or Firm*—Robert F. Hightower

(57) ABSTRACT

In one embodiment, a power supply controller is configured to switch a power switch of a power supply when a voltage across the switch is at a minimum value.

15 Claims, 5 Drawing Sheets

METHOD OF FORMING A POWER SUPPLY CONTROLLER AND STRUCTURE THEREFOR

BACKGROUND OF THE INVENTION

The present invention relates, in general, to electronics, and more particularly, to methods of forming semiconductor devices and structures.

In the past, the semiconductor industry utilized various methods and structures to form power supply controllers that would assist in regulating an output voltage to a desired value. In some power supply configurations, two transistors were connected in a stacked configuration or half-bridge circuit configuration in order to drive an inductor and form the output voltage. Some examples of such power supply configurations were LLC resonant power converters and other resonant type power converters. Each of the two transistors in the half-bridge circuit were driven by separate transistor drivers. Typically, the two transistors were switched synchronously so that the two transistors were not enabled at the same time. In order to ensure that one transistor turned off before the next transistor turned on, delay circuits or logic circuits were used to provide a dead time between turning off one transistor and turning on the other transistor. This a dead time ensured that shoot-through currents were not formed by simultaneous conduction of both transistors. The duration of the dead time was a fixed time and usually was selected for the lightest load condition in order to ensure the elimination of shoot-through currents. For the case of resonant type power converters, the dead times were prolonged which allowed voltage swing of the resonant LC tank circuit to change the voltage at the center of the half-bridge. This dead time caused energy losses in the half-bridge circuit which reduced the efficiency of the system using the circuit.

Accordingly, it is desirable to have a power supply controller that more efficiently reduces shoot-through current and that controls shoot-through current and resonant switching without imposing a fixed dead-time.

For simplicity and clarity of the illustration, elements in the figures are not necessarily to scale, and the same reference numbers in different figures denote the same elements. Additionally, descriptions and details of well-known steps and elements are omitted for simplicity of the description. As used herein, current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, a person of ordinary skill in the art will appreciate that complementary devices are also possible in accordance with the present invention. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action. For clarity of the drawings, doped regions of device structures are illustrated as having generally straight line edges and precise angular corners. However, those skilled in the art understand that due to the diffusion and activation of dopants, the edges of doped regions generally may not be straight lines and the corners may not be precise angles.

DETAILED DESCRIPTION OF THE DRAWINGS

Figure 1:
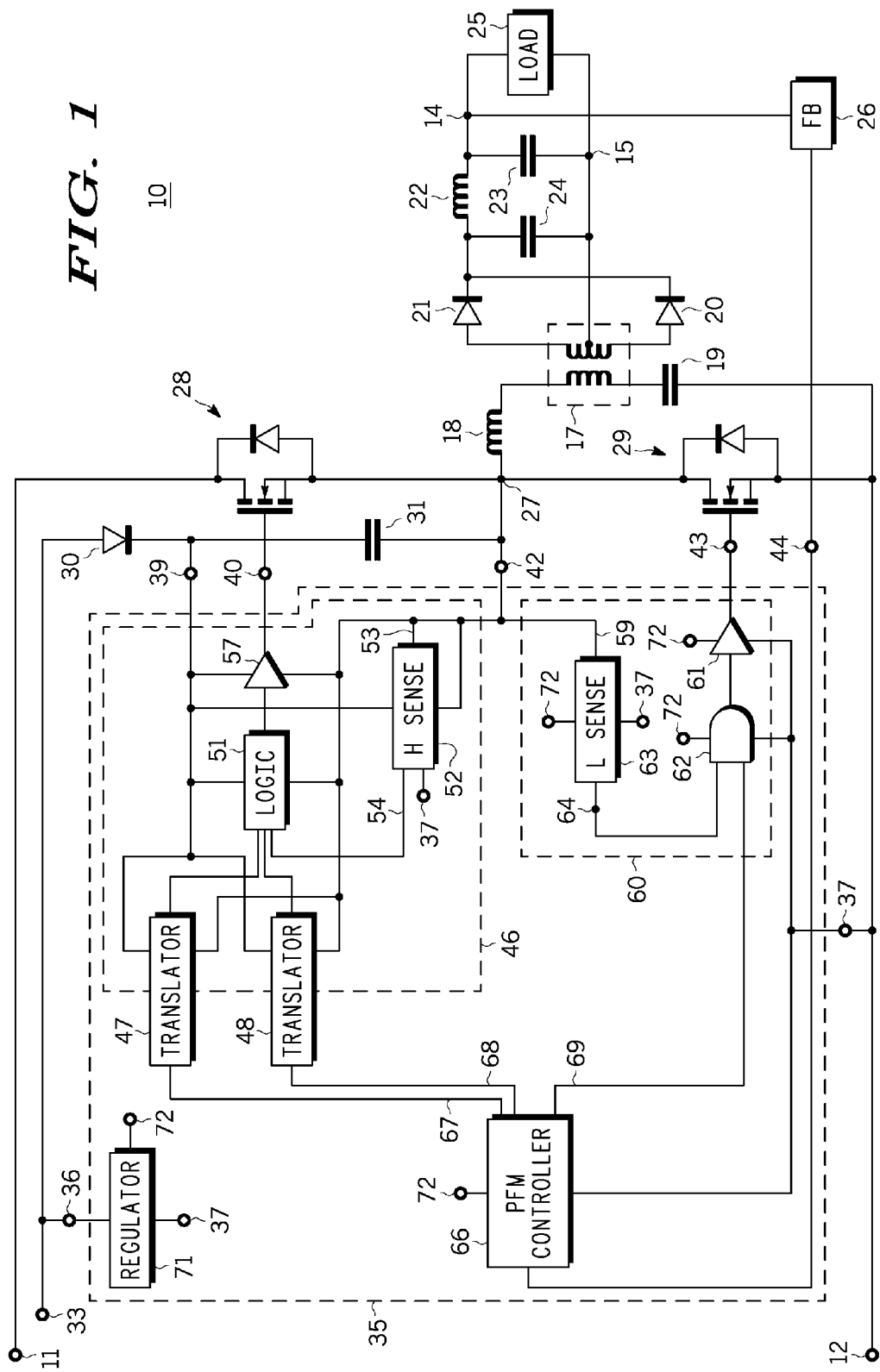
FIG. 1 schematically illustrates an embodiment of a portion of a power supply system that includes a power supply controller in accordance with the present invention.

FIG. 1 schematically illustrates an embodiment of a portion of a power supply system 10 that includes an exemplary embodiment of a portion of a power supply controller 35 that is used to regulate an output voltage that is formed by system 10. As will be seen further hereinafter, controller 35 is configured to control the power switches of system 10 to switch when the voltage across the switches is at a minimum value and preferably is substantially zero.

System 10 receives power, such as a rectified ac voltage, between a power input terminal 11 and a power return terminal 12 and forms an output voltage between a voltage output 14 and a voltage return 15. The voltage between terminals 11 and 12 is often referred to as a bulk voltage. System 10 is illustrated in FIG. 1 is a resonant power supply system that includes a transformer 17 which separates system 10 into a primary side and a secondary side. The primary side is connected to a primary winding of transformer 17 and the secondary side is connected to a secondary winding of transformer 17. The secondary side typically includes rectifier diodes 20 and 21, an inductor 22, a filter capacitor 23, and a feedback network 26. As is well known in the art, feedback network 26 receives the output voltage and forms a feedback signal that is representative of the value of the output voltage between output 14 and return 15. Feedback network 26 may be an optical coupler or other type of well-known feedback network. Generally, a resonant inductor 18 and a resonant capacitor 19 are connected to the primary winding of transformer 17. A first power switch, such as an MOS transistor 28, and a second power switch, such as an MOS transistor 29, are connected in a stacked configuration or half-bridge configuration between terminal 11 and terminal 12. The diodes in parallel with transistors 28 and 29 represent the body diodes of the transistors. Transistors 28 and 29 are connected together at a common node 27 of the half-bridge configuration which is also connected to inductor 18. Although transistors 28 and 29 are illustrated as external to controller 35 in the embodiment of FIG. 1, those skilled in the art will appreciate that transistors 28 and 29 may be within controller 35 in other embodiments.

In most embodiments, the voltage between terminals 11 and 12 is received from a rectified household mains. For operation in various different countries, system 10 is configured to receive a voltage between terminals 11 and 12 that may be as high as six hundred volts (600 V) or as low as two hundred fifty volts (250 V) depending on the country which is providing the voltage to terminals 11 and 12. Consequently, system 10 generally receives a lower voltage on an input 33 that is applied to controller 35 between a power input 36 and a power return 37 of controller 35. The voltage received on input 33 may be derived from the secondary side of system 10 or may be available from another source. A boost network that includes a diode 30 and a boost capacitor 31 is connected between input 33 and common node 27 of the half-bridge. The boost network of diode 30 and capacitor 31 is used to form a supply voltage that is used for forming the drive signal for transistor 28. Controller 35 receives the boost voltage on a boost input 39. Such boost networks are well known to those skilled in the art.

Controller 35 usually includes a switching power supply circuit such as a pulse frequency modulated (PFM) controller 66 that receives the feedback signal from network 26 through a feedback input 44 of controller 35 and responsively forms PFM control signals that are used to form drive signals for transistors 28 and 29. PFM controller 66 may be any of a variety of well-known PFM controllers including a phase shifted PWM controller. Controller 35 includes a high-side control circuit 46 that is used to form a first drive signal for controlling transistor 28 and a low-side control circuit 60 that is used to form a second drive signal for controlling transistor 29. The output of driver 61 is coupled to transistor 29 through an output 43 of controller 35. Controller 35 may also include an internal regulator 71 that is connected between input 36 and return 37 to receive the input voltage and form an internal operating voltage on an output 72 for operating elements of controller 35 such as PFM controller 66 and low-side control circuit 60. Low-side control circuit 60 includes a driver circuit or driver 61, control logic, such as an AND gate 62, and a low-side sense circuit or L-sense 63. High-side control circuit 46 includes a driver circuit or driver 57, a logic circuit or logic 51, a high-side sense circuit or H-sense 52, and level shifter circuits or level translator circuits 47 and 48. As will be seen further hereinafter, the elements of high-side control circuit 46 operate from the boost voltage that is received between input 39 and a switch input 42. In order to form the drive signal from driver 57 at a voltage that is sufficient to enable transistor 28, high-side control circuit 46 operates from the boost voltage. The boost voltage is formed by the charge stored on capacitor 31 as a result of the switching of transistors 28 and 29 and is the differential value between inputs 39 and 42. The average value of the boost voltage is approximately equal to the voltage received on input 36 minus the voltage drop across diode 30. When referenced to terminal 12, the value of the boost voltage is typically oscillating, and its peak value is greater than the input voltage received on terminal 11.

As will be seen further hereinafter, high-side control circuit 46 typically is formed in an isolated or floating region of the semiconductor die on which controller 35 is formed in order to isolate the remainder of controller 35 from the boost voltage that is utilized to operate circuit 46. For embodiments where circuit 46 operates from a lower voltage that would not damage other portions of controller 35, circuit 46 may not be formed in such a floating or isolated region. Circuits 47 and 48 are configured to receive signals from PFM controller 66 and shift or translate the voltage value of the signals from the voltage that is referenced to the voltage of output 72 to a higher voltage value that is compatible with the boost voltage used for operating circuit 46. Also as will be seen further hereinafter, a portion of circuits 47 and 48 is formed in the floating region.

During operation, controller 66 forms a control signal 67 that is used by circuit 46 to assert the first drive signal on an output 40 and enable transistor 28. Subsequently, PFM controller 66 usually forms a second control signal 68 that is used by circuit 46 to disable transistor 28. During a period of time that transistor 28 is enabled, transistor 28 couples the voltage from input terminal 11 to common node 27. Subsequently, PFM controller 66 asserts a control signal 69 that is used by circuit 60 for enabling transistor 29. Negating signal 69 is used for disabling transistor 29.

Switching the half-bridge forms a bridge voltage on node 27 which is received by controller 35 on switch input 42. It is desirable to enable transistors 28 and 29, in response to the PFM control signals, when the voltage dropped across the respective transistor is zero. H-sense 52 and L-sense 63 are configured to form control signals that are used to inhibit enabling respective transistors 28 and 29 in response to the PFM control signals until the voltage dropped across respective transistors 28 and 29 has reached a minimum value. The minimum value preferably is zero volts, however, some voltage may be dropped across the transistors due to inaccuracies of the sensing and time delay in the sense loop. Additionally, there may be some minor offset voltages within H-sense 52 or L-sense 63 that prevents switching at precisely zero, thus, the switching generally occurs at a minimum value that is close to zero. H-sense 52 and L-sense 63 are configured to receive the bridge voltage and inhibit enabling respective transistors 28 and 29 until the bridge voltage is approximately equal to the voltage on the drain of transistor 28 or the source of transistor 29, respectively.

Figure 2:
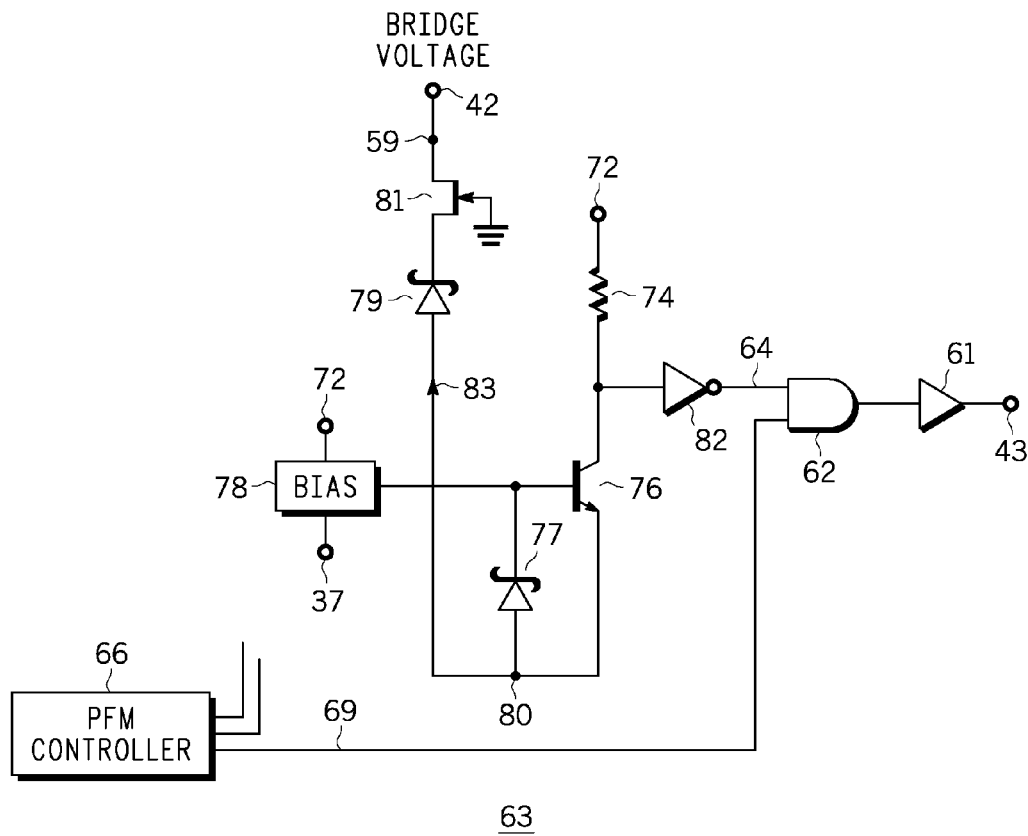
FIG. 2 schematically illustrates an embodiment of a portion of a sense circuit of the power supply controller of FIG. 1 in accordance with the present invention.

FIG. 2 schematically illustrates an exemplary embodiment of a portion of L-sense 63. This description has references to FIG. 1 and FIG. 2. The exemplary embodiment of L-sense 63 includes a high voltage JFET transistor or JFET 81, a Schottky diode 79, a bipolar transistor 76, a clamp Schottky diode 77, a pull up resistor 74, an inverter 82, and a bias voltage generator or bias 78 that forms a bias voltage that is used to bias transistor 76 at a voltage that is sufficient for enabling transistor 76. As will be seen further hereinafter, JFET 81 has a gate that is connected to the lowest voltage of controller 35 through the substrate of the semiconductor die on which JFET 81 is formed. When the value of the bridge voltage on input 42 is greater than the pinch-off voltage of JFET 81, the channel region of JFET 81 is substantially depleted of carriers which allows JFET 81 to drop most of the value of the bridge voltage across the structure of JFET 81 and limits the value of the voltage applied to diode 79 to a value that is less than the breakdown voltage of diode 79. One example of such a high voltage JFET is disclosed in U.S. Pat. No. 6,943,069 issued to Josef Halamik et al on Sep. 13, 2005 which is hereby incorporated herein by reference. For example, the maximum value of the bridge voltage may be as high as about six hundred volts (600 V) and JFET 81 may have a pinch-off voltage of about twenty five volts (25 V) that limits the voltage applied to diode 79 to a voltage that is less than approximately thirty volts (30 V). When transistor 28 is enabled, the bridge voltage is at a high value and JFET 81 applies a corresponding low voltage to diode 79. This voltage reverse biases diode 79 which allows Schottky diode 77 to maintain transistor 76 disabled. Disabling transistor 76 forces the output of inverter 82 low which drives the output of AND gate 62 low. Those skilled in the art will appreciate that diode 77 does not have to be a Schottky diode, but may be another type of diode such as a P-N junction diode.

At some point, PFM controller 66 asserts PFM control signal 68 to disable transistor 28 and then asserts PFM control signal 69 to enable transistor 29, However, the low from inverter 82 blocks PFM control signal 69 from propagating through gate 62 thereby inhibiting driver 61 from forming the drive signal that would enable transistor 29. While both transistors 28 and 29 are disabled, the bridge voltage decreases due to the oscillating action of inductor 18 and capacitor 19. When the value of the bridge voltage decreases to a value that is approximately the value of the bias voltage minus the base-emitter voltage (Vbe) of transistor 76 minus the forward voltage of diode 79, JFET 81 no longer operates in the pinch-off region which allows a current 83 to flow through resistor 74, through transistor 76, through diode 79, and through JFET 81 to input 42. The current flow enables transistor 76 which forces the output of inverter 82 high. Note that diode 79 and JFET 81 enable transistor 76 under the condition that input 42 is forced to substantially zero voltage with respect to return 37. The high from inverter 82 enables gate 62 and allows PFM control signal 69 to propagate through gate 62 so that driver 61 may assert the drive signal and enable transistor 29. Inhibiting controller 35 from enabling transistor 29 until the bridge voltage reaches a value that is substantially equal to the bulk voltage on terminal 12 (minus any voltage drop across transistor 29 such as across the body diode of transistor 29) results in enabling transistor 29 when the voltage dropped across transistor 29 is at a minimum value thereby reducing switching losses and improving the efficiency provided to system 10 by controller 35.

Figure 3:
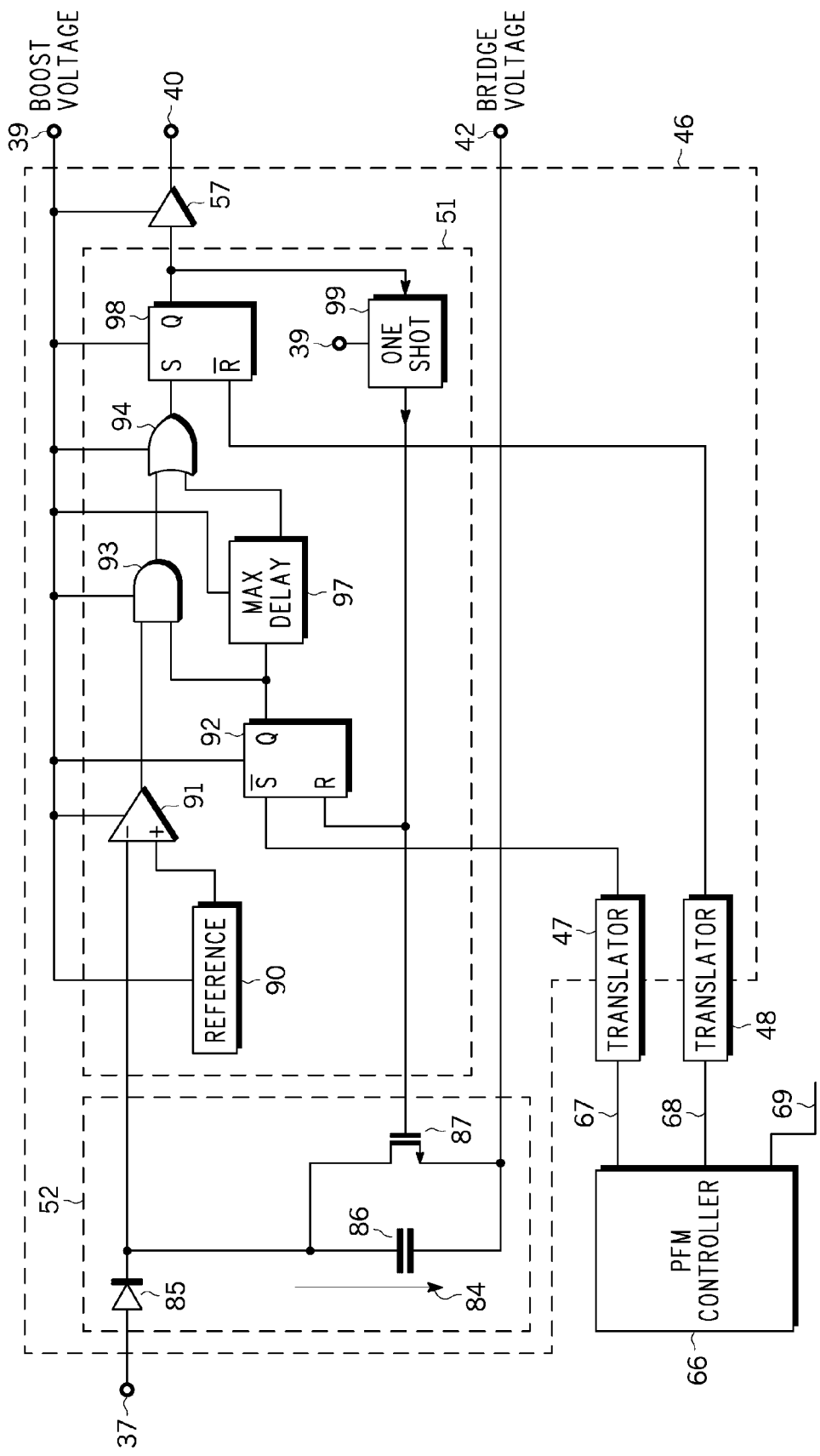
FIG. 3 schematically illustrates an embodiment of a portion of another sense circuit of the power supply controller of FIG. 1 in accordance with the present invention.

FIG. 3 schematically illustrates a simplified embodiment of a portion of high-side control circuit 46 and an exemplary embodiment of H-sense 52. This description has references to FIG. 1 and FIG. 3. The exemplary embodiment of logic 51 that is illustrated in FIG. 3 includes a reference generator or reference 90, a comparator 91, latches 92 and 98, an AND gate 93, an OR gate 94, a pulse generator such as a one-shot 99, and a max delay circuit or max delay 97 that limits the maximum time interval between PFM controller 66 asserting signal 67 and the enabling of transistor 28. As illustrated in FIG. 3, driver 57, latches 92 and 98, one-shot 99, max delay 97, AND gate 93, OR gate 94, comparator 91, and reference 90 are connected to receive power from the boost voltage by being connected to receive power between input 39 and input 42. The exemplary embodiment of H-sense 52 includes a storage element illustrated as a capacitor 86, a discharge transistor 87, and a high breakdown voltage PN junction capacitor illustrated as a diode 85. As will be seen further hereinafter, H-sense 52 is configured to repeatedly cycle through a charge accumulation and transfer cycle that is used to switch transistor 28 when the voltage drop across transistor 28 is a minimum value. The high voltage PN junction capacitor of diode 85 is used to transfer charge between the high breakdown voltage PN junction capacitor and capacitor 86. The breakdown voltage of diode 85 generally is at least the maximum value of the bridge voltage so that the capacitance of diode 85 can be charged to that voltage. After transistor 28 is disabled and the bridge voltage decreases to approximately the value of return 37, capacitor 86 stores a charge representing the bridge voltage reaching a value substantially equal to the bulk voltage. Subsequently, when transistor 29 is disabled H-sense 52 uses the charge stored on capacitor 86 to determine that the bridge voltage has again reached a value that is approximately the bulk voltage, thus, the value at which the voltage across transistor 28 is a minimum. This configuration facilitates enabling transistor 28 when the voltage drop across transistor 28 is a minimum value and improves switching efficiency. The voltage across transistor 28 desirably is zero volts but variations in the line voltage and other variations may prevent the voltage from being precisely zero. Generally, the voltage drop is no greater than about one volt.

Assuming that the output of comparator 91 is high, when signal 67 is asserted to begin enabling transistor 28, signal 67 sets latch 92 and forces the Q output high. The high from latch 92 propagates through gates 93 and 94 and sets latch 98. The high from latch 98 fires one-shot 99 which enables transistor 87. Enabling transistor 87 discharges capacitor 86. The high from latch 98 also begins enabling transistor 28 which holds the bridge voltage on input 42 at substantially the bulk voltage on terminal 11 (minus the voltage drop across transistor 28). Because transistor 87 is enabled, diode 85 is reverse biased and the capacitance of diode 85 stores a voltage value that is substantially equal to the bulk voltage. After the time interval of one-shot 99 expires, transistor 87 is disabled and capacitor 86 is connected in series with the capacitance of diode 85 thereby forming a capacitive divider. Since transistor 28 is still enabled, the voltage on remains at substantially the bulk voltage, thus, the voltage on capacitor 86 remains substantially zero. The time interval of one-shot 99 is selected to ensure that transistor 87 remains enabled until the voltage on input 42 has stabilized at substantially the bulk voltage. The time interval usually is less than the time that transistor 28 is enabled but long enough so that the capacitance of diode 85 has time to charge. Thus, the capacitance of diode 85 is charged during the charge accumulation portion of the cycle.

After transistor 28 is enabled long enough, PFM controller 66 subsequently asserts PFM control signal 68 to begin disabling transistor 28. Circuit 48 receives the asserted signal 68 and forms a pulse that has a duration that is long enough to reset latch 98 and disable transistor 28. Thereafter, controller 66 asserts control signal 69 to enable transistor 29, however, L-sense 63 prevents enabling transistor 29 until the voltage across transistor 29 is approximately zero as described hereinbefore. When transistor 28 is disabled, energy stored in inductor 18 begins forcing the bridge voltage low. As the value of the bridge voltage decreases from the bulk voltage of terminal 11 toward the voltage of return terminal 12, charge is transfered from the capacitance of diode 85 to capacitor 86 thereby beginning to discharge the capacitance of diode 85. When the bridge voltage has decrease to substantially the value of the voltage on terminal 12 (minus the voltage drop across transistor 29 and the body diode thereof), the charge that was stored on the capacitance of diode 85 is substantially depleted and capacitor 86 has become charged to a voltage value that is representative of the value of the bulk voltage during the previous portion of the cycle when transistor 28 was enabled. Thus, the voltage on capacitor 86 is representative of the previous value of the bulk voltage when transistor 28 was enabled. The series capacitance combination of capacitor 86 and the capacitance of diode 85 distributes the bridge voltage that is stored on the capacitance of diode 85 inversely proportional to their capacitance values as shown by the following equation:

$$V86 = Vbridge*(C85/(C86+C85))$$

where;
V86=Voltage across capacitor 86,
Vbridge=the bridge voltage on input 42,
C86=capacitance of capacitor 86, and
C85=capacitance of diode 85.

Preferably, the design parameters of diode 85 are selected so that the capacitance of diode 85 is much smaller than the capacitance of capacitor 86, thus, the capacitance of diode 85 can store a much larger voltage than capacitor 86. Consequently, the majority of the bridge voltage is stored on the capacitance of diode 85 leaving a smaller portion to be stored on capacitor 86 as a voltage indicated by an arrow 84. The capacitance of capacitor 86 usually is selected to be between ten to one hundred (10-100) times greater than the capacitance of diode 85 and preferably is about thirty (30) times greater than the capacitance of diode 85. Consequently, the capacitance of diode 85 stores about ninety seven percent (97%) and capacitor 86 stores approximately three percent (3%) of the value of the bulk voltage (minus the drop across transistor 28). Also, the value of the voltage stored on capacitor 86 preferably is smaller then the breakdown voltage of transistor 87, capacitor 86, and the input of comparator 91.

During this charge transfer sequence, as capacitor 86 charges to a voltage value that is larger than the value of the voltage from reference 90, the negative input of comparator 91 receives a value that is greater than the value of the reference voltage which forces the output of comparator 91 low. The low from comparator 91 blocks the signal from latch 92 from propagating through AND gate 93. Consequently, if PFM controller 66 were to assert PFM control signal 67, latch 92 would become set, however, the signal from latch 92 would not propagate through gate 93 and transistor 28 would not be enabled. Additionally, L-sense 63 detects the substantially zero voltage across transistor 29 and facilitates gate 62 causing transistor 29 to be enabled.

While transistor 29 is enabled, transistor 29 holds the bridge voltage on input 42 to a value that is substantially the value of the voltage on terminal 12 (minus the voltage drop across transistor 29). During this time, capacitor 86 forces the output of comparator 91 low, as described hereinbefore. At some point during the operation, PFM controller 66 will negate PFM control signal 69 which disables transistor 29. When transistor 29 is disabled, the energy stored in inductor 18 and capacitor 19 (FIG. 1) causes the bridge voltage to increase until the body diode of transistor 28 is enabled to clamp the bridge voltage at substantially the value of the bulk voltage on terminal 11. After negating PFM control signal 69, PFM controller 66 forces PFM control signal 67 high which causes circuit 47 to generate a pulse and set latch 92. However, the low from comparator 91 prevents the high from latch 92 from propagating through gate 93. Also, the rising value of the bridge voltage reverse biases diode 85, via capacitor 86, and causes capacitor 86 to transfer charge back to the capacitance of diode 85. As the value of the bridge voltage on input 42 reaches a value substantially equal to bulk voltage, the value of the voltage on capacitor 86 decreases past the value of the reference voltage from reference 90 (the voltages are referenced to input 42). At the point that capacitor 86 has transferred sufficient charge back to the capacitance of diode 85 so that the voltage on capacitor 86 is approximately zero, then the value of the voltage on input 42 is substantially the value of the bridge voltage during the previous time that transistor 28 was enabled. Consequently, the voltage drop across transistor 28 is a minimum and it is the proper time to enable transistor 28 and again begin the charge accumulation portion of the cycle. The value of the voltage on capacitor 86 reaching substantially the value of the reference voltage forces the output of comparator 91 high. The high from comparator 91 enables gate 93 and allows the high from latch 92 to propagate through OR gate 94 and set latch 98. The high from latch 98 enables transistor 28 and also fires one-shot 99. The high going pulse from one-shot 99 enables transistor 87 and discharges the remainder of the charge from capacitor 86 so that capacitor 86 has no charge at the beginning of the next charge transfer portion of the cycle. After the time interval of one-shot 99 has expired, the cycle continues as previously described with the charge of diode 85 again being distributed between capacitor 86 and diode 85 and capacitor 86 again being charged to a voltage that is representative of the value of the bridge voltage during the time that transistor 28 is enabled.

Consequently, H-sense 52 inhibits controller 35 from enabling transistor 28 until the bridge voltage has reached a value that is substantially equal to the value of the bridge voltage during the previous time that transistor 28 was enabled (minus any voltage drop across transistor 28 such as across the drain-source resistance of transistor 28). Inhibiting controller 35 from enabling transistor 28 until the bridge voltage reaches substantially the previous bridge voltage value results in enabling transistor 28 when the voltage dropped across transistor 28 is at a minimum value thereby reducing switching losses and improving the efficiency provided to system 10 by controller 35. Configuring diode 85 to have a junction capacitance and share the value of the bridge voltage with capacitor 86 allows comparator 91 to receive a small voltage value for determining the proper time to enable transistor 28. Without the series capacitances of diode 85 and capacitor 86, comparator 91 would have to receive a large voltage value which would make it difficult to built comparator 91 on the same substrate with the other elements of logic 51.

In one example embodiment, the value of the bulk voltage was about six hundred volts (600 V) and diode 85 was configured to have a capacitance ratio to capacitor 86 of about one to thirty (1:30). As a result, the voltage transferred to and stored on the capacitance of diode 85 was about six hundred volts (600 V) during the time that transistor 87 was enabled. After transistor 87 was disabled and after transistor 28 was disabled and the bridge voltage decreased to approximately the value of return 37 the charge stored on the capacitance of diode 85 was shared with capacitor 86 so that capacitor 86 stored a voltage of about twenty volts (20 V) and the capacitance of diode 85 stored about twenty volts (20 V). Thus, capacitor 86 is charged to a voltage that represents the maximum value of the bridge voltage during the time that transistor 28 was enabled. In this example embodiment, the reference voltage from reference 90 was approximately ten millivolts (10 mv) so that comparator 91 did not change state until the voltage stored on capacitor 86 was substantially discharge to approximately zero volts which represented the bridge voltage reaching substantially the previous value of the bulk voltage when transistor 28 was previously enabled.

Figure 4:
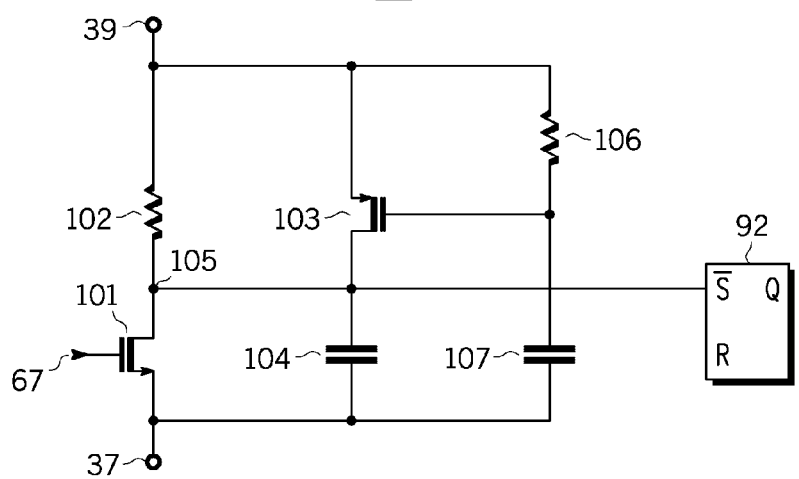
FIG. 4 schematically illustrates an embodiment of a portion of a shifter circuit of the power supply controller of FIG. 1 in accordance with the present invention.

FIG. 4 schematically illustrates an embodiment of a circuit suitable for use as circuits 47 and 48. Level translator circuit 47 is utilized to shift or translate the voltage of the logic levels of the control signal, such as control signal 67, from the voltage of regulator 71 to the boost voltage on input 39. Translator circuit 47 receives PFM control signal 67 and forms a negative going pulse upon receiving the rising edge of signal 67. The high of signal 67 enables transistor 101 to pull the set bar input low and set latch 92. Because the boost voltage on input 39 may have abrupt changes during the operation of transistor 28 and because the drain of transistor 101 has parasitic capacitances to the substrate represented as capacitor 104, circuit 47 also includes a transistor 103 a capacitor 107, and resistor 106 that prevents the abrupt changes of the boost voltage from altering the output of circuit 47. An abrupt change in the boost voltage would be coupled across capacitor 104 and create a current flow through resistor 102 in order to begin charging capacitor 104. This could produce an unwanted parasitic set pulse for latch 92. But, the rapid voltage change forms a current change through resistor 106 and a resulting current flow therethrough in order to begin charging capacitor 107. The current flow to capacitor 107 forms a voltage drop across resistor 106 that enables transistor 103. Transistor 103 turns-on which begins conducting current to charge capacitor 104 and clamp the value of the voltage on the set bar input of latch 92 to a voltage substantially equal to the value of the boost voltage on input 39. Enabling transistor 103 prevents the rapid change in the value boost voltage from falsely changing the state of latch 92.

In order to facilitate this functionality for controller 35, input 36 is configured to receive a voltage that is less than the bulk voltage and return 37 is configured to be connected to terminal 12. Input 39 is configured to receive the boost voltage. Regulator 71 is connected between input 36 and return 37 to form an internal operating voltage on an output 72 of regulator 71. PFM controller 66 is connected between output 72 and return 37 and also has a feedback control input connected to input 44 to receive the feedback signal from feedback network 26. A drain of JFET 81 is connected to input 42 and a source is connected to the cathode of diode 79. An anode of diode 79 is commonly connected to an emitter of transistor 76 and an anode of diode 77. A cathode of diode 77 is commonly connected to a base of transistor 76 and to an output of bias 78. A Collector of transistor 76 is commonly connected to an input of inverter 82 to and a first terminal of resistor 74. A second terminal of resistor 74 is connected to output 72 of regulator 71. The output of inverter 82 is connected to a first input of gate 62 which has an output connected to an input of driver 61. The output of driver 61 is connected to output 43 which is configured to be connected to a gate of transistor 29. A second input of gate 62 is connected to receive signal 69 from controller 66. An input of circuit 47 is connected to receive signal 67 from controller 66 and an output is connected to the set bar input of latch 92. An input of circuit 48 is connected to receive signal 68 from controller 66 and an output is connected to a reset bar input of latch 98. An anode of diode 85 is connected to return 37 and a cathode is commonly connected to an inverting input of comparator 91, a first terminal of capacitor 86, and a drain of transistor 87. The source of transistor 87 is commonly connected to a second terminal of capacitor 86 and input 42. A non-inverting input of comparator 91 is connected to receive the reference voltage from reference 90. The output of comparator 91 is connected to a first input of gate 93. A second input of gate 93 is commonly connected to an input of delay 97 and a Q output of latch 92. The output of gate 93 is connected to a first input of gate 94 which has an output connected to the set input of latch 98. A second input of gate 94 is connected to an output of delay 97. The Q output of latch 98 is commonly connected to the input of driver 57 and the input of one-shot 99. The output of driver 57 is connected to output 40 which is configured to be connected to a gate of transistor 28. The output of one-shot 99 is connected to a gate of transistor 87 and to a reset input of latch 92.

Figure 5:
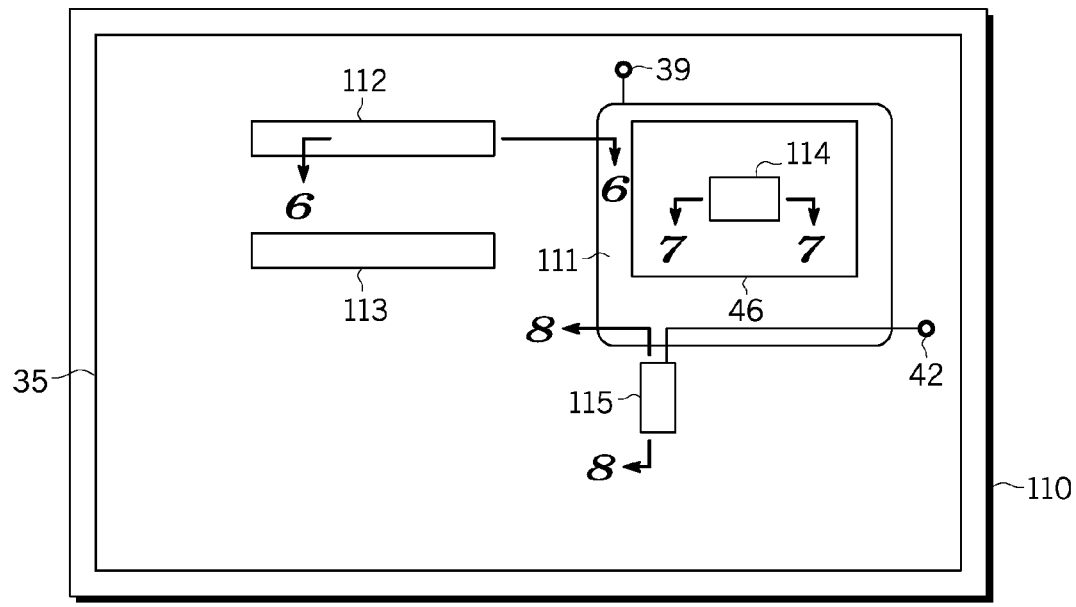
FIG. 5 illustrates a simplified enlarged plan view of a semiconductor die on which the power supply controller of FIG. 1 is formed in accordance with the present invention.

FIG. 5 illustrates an enlarged simplified plan view of a semiconductor die 110 on which controller 35 is formed. Controller 35 is illustrated in general manner by a box bearing the number 35. A portion 112 includes at least transistor 101 of translator circuit 47 that was illustrated in FIG. 4. A portion 113 includes portions of circuit 48 that was illustrated in FIG. 3. A portion 114 includes at least diode 85 that was illustrated in FIG. 3. Portion 115 includes at least JFET 81 that was illustrated in FIG. 2. Controller 35 and is formed on die 110 by semiconductor manufacturing techniques that are well known to those skilled in the art.

Figure 6:
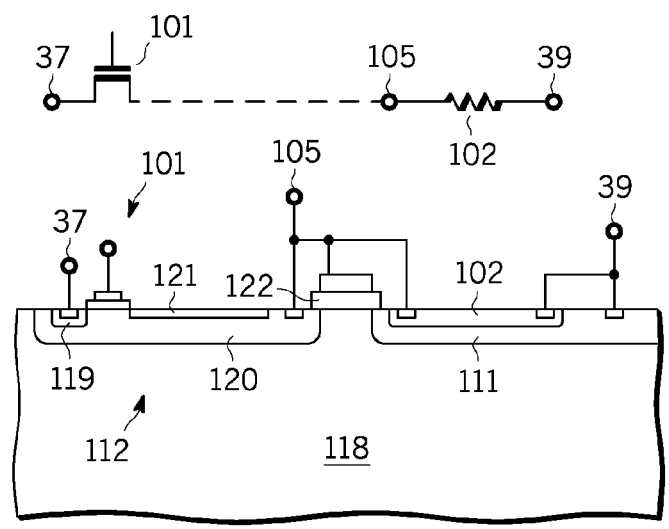
FIG. 6 illustrates a simplified enlarged cross-sectional view of a portion of the semiconductor die of FIG. 5 in accordance with the present invention.

FIG. 6 illustrates an enlarged simplified cross-sectional view of die 110 taken along cross-section line 6-6. Cross-section line 6-6 is formed through transistor 101 and resistor 102 that are illustrated in FIG. 4.

Figure 7:
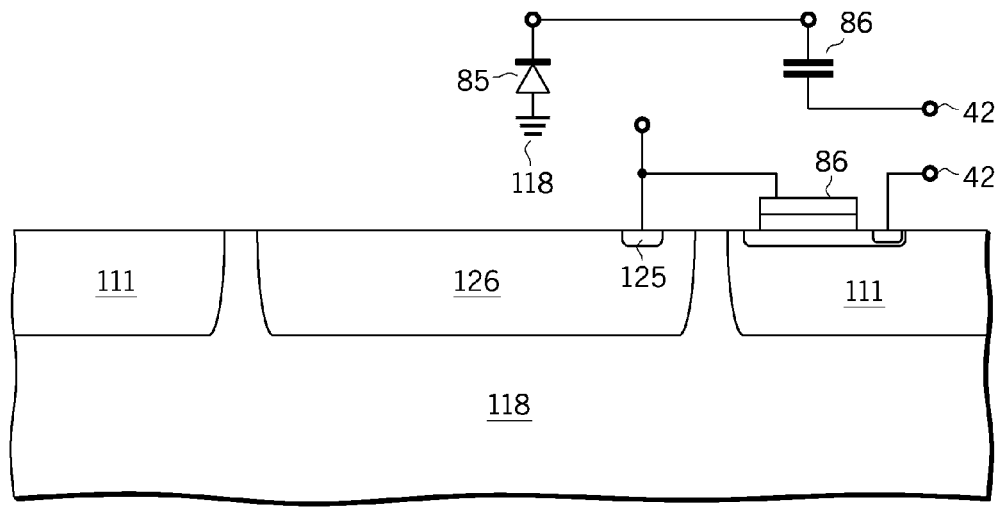
FIG. 7 illustrates a simplified enlarged cross-sectional view of another portion of the semiconductor die of FIG. 5 in accordance with the present invention.

FIG. 7 illustrates an enlarged simplified cross-sectional portion of die 110 taken along cross-section line 7-7. Cross-section line 7-7 is taken through diode 85 that is illustrated in FIG. 3. This description has references to FIG. 1 and FIG. 5-FIG. 7. A doped region 111 that is formed on a surface of a substrate 118 is the floating region in which the elements of circuit 46 are formed including latches 92 and 98, driver 57, one-shot 99, AND gate 93, or gate 94, comparator 91, reference 90, transistor 87, and a portion of translator circuits 47 and 48. Typically, the portion of circuits 47 and 48 that includes capacitor 107, resistors 106 and 102, and transistor 103 are also formed within region 111. Region 111 has a conductivity type that is opposite to the conductivity of substrate 118.

Referring to FIG. 6, die 110 is formed on semiconductor substrate 118. A doped region 120 is formed on the surface of substrate 118 to function as transistor 101. Region 120 has a conductivity type that is opposite to the conductivity of substrate 118. To form resistor 102, there is a doped region on the surface of region 111, which has a conductivity type that is opposite to the conductivity of region 111. Doped region 120 is connected to resistor 102 by a conductor, such as a metal, that also provides a connection to node 105. An example of using a doped region such as region 111 to isolate portions of a circuit from other portions of a circuit is described in U.S. Pat. No. 6,097,075 issued to Antonin Rozsypal et al on Sep. 13, 2005.

Referring to FIG. 7, diode 85 includes a first doped region 126 that is formed on the surface of substrate 118. Doped region 126 forms the cathode of diode 85. A second doped region 125 is formed within a portion of region 126 to form the drain region contact of diode 85. Anode of diode 85 is formed by substrate 118. Regions 125 and 126 have a conductivity type that is opposite to the conductivity of substrate 118.

Figure 8:
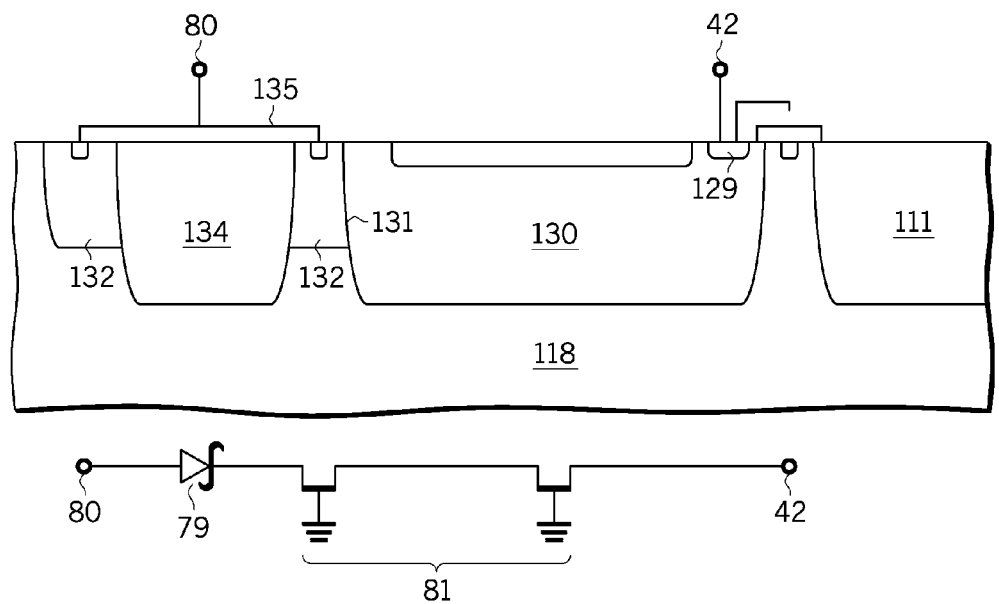
FIG. 8 illustrates a simplified enlarged cross-sectional view of another portion of the semiconductor die of FIG. 5 in accordance with the present invention.

FIG. 8 illustrates an enlarged simplified cross-sectional view of die 110 along cross-section line 8-8. JFET 81 and diode 79 that are illustrated in FIG. 2 are formed within portion 115. JFET 81 includes a first doped region 130 that is formed on the surface of substrate 118. Region 130 is a conductivity type that is the opposite to the conductivity type of substrate 118. A doped region 129 that is formed along an edge of region 130 forms a drain region contact that provides a low resistance connection between region 130 and a conductor electrode that is connected to region 130. The portion of region 130 between region 129 and an opposite edge of region 130 represent the drain region of JFET 81. An extreme edge 131 of region 130 forms the source of JFET 81. Another doped region 134 forms the cathode of Schottky diode 79 and a metal 135 that is formed on the surface and electrically connected to region 134 forms the anode of diode 79. Another doped region 132 is formed on the surface of substrate 118 and extends into regions 130 and 134 in order to form an electrical connection between the source of JFET 81 and the cathode of diode 79. Substrate 118 functions as the gate of the JFET formed between substrate 118 and region 130. Another JFET that has a higher pinch-off voltage usually is formed at the interface of regions 132 and substrate 118. Both of these JFETs are illustrated as a portion of JFET 81. As stated hereinbefore, an example of a JFET that has characteristics similar to JFET 81 is described in U.S. Pat. No. 6,943,069 that issued to Josef Halamik et al on Sep. 13, 2005.

In view of all of the above, it is evident that a novel device and method is disclosed. Included, among other features, is configuring controller 35 to control the power switches to switch when the voltage across the switches is at a minimum value that is close to substantially zero. Such switching improves the efficiency of the system that is controlled by controller 35. Forming portions of the circuitry of controller 35 is an isolated region of a semiconductor die facilitates forming both high voltage and low voltage portions of controller 35 on one semiconductor die.

While the subject matter of the invention is described with specific preferred embodiments, it is evident that many alternatives and variations will be apparent to those skilled in the semiconductor arts. For example, other circuits may be used for L-sense 63 and H-sense 52 as long as the circuitry controls the power switches to switch when the voltage across the switches is at a low value that improves efficiency. Reference 90 can be build as offset of comparator 91. Also, other logic circuits may be used for gate 62 and logic 51 provided that the alternate circuits allow L-sense 63 and H-sense 52 to inhibit enabling the power switches until the bridge voltage has reached a value that minimizes the voltage across the switch. Although controller 35 is illustrated as a portion of a resonant power supply system, controller 35 may be used in other power supply configurations including a boost or a buck configuration. Additionally, the word "connected" is used throughout for clarity of the description, however, it is intended to have the same meaning as the word "coupled". Accordingly, "connected" should be interpreted as including either a direct connection or an indirect connection.

The invention claimed is:

1. A power supply controller comprising:

A switching controller;

a first circuit configured to form a first drive signal responsively to the switching controller to control a first transistor of a half-bridge to regulate a value of an output voltage formed by the power supply controller;

a second circuit configured to form a second drive signal responsively to the switching controller to control a second transistor of the half-bridge;

a first sense circuit configured to receive a bridge voltage formed by the half-bridge and to inhibit driving the first transistor responsively to the bridge voltage having a value that is less than a first value, the first sense circuit including a capacitor having a first terminal coupled to receive the bridge voltage and a second terminal, a diode having a cathode coupled to the second terminal of the capacitor and an anode coupled to a supply return, a transistor having a first current carrying electrode coupled to receive the bridge voltage, a second carrying electrode coupled to the second terminal of the capacitor, and a control electrode coupled to receive a signal from the first drive signal; and a second sense circuit configured to receive the bridge voltage and to inhibit driving the second transistor responsively to the bridge voltage having a value greater than a second value that is less than the first value.

2. The power supply controller of claim 1 wherein the first value is approximately equal to a value of a supply voltage received by the first transistor.

3. The power supply controller of claim 1 wherein the second value is approximately equal to a value of a supply voltage received by the second transistor.

4. The power supply controller of claim 1 wherein the second circuit includes a JFET coupled to receive the bridge voltage and form a current responsively to the bridge voltage reaching the second value.

5. The power supply controller of claim 4 wherein the second circuit is configured to convert the current to a control signal that enables the second circuit to drive the second transistor responsively to the switching controller.

6. The power supply controller of claim 1 wherein the first sense circuit stores a charge representing the bridge voltage and uses the stored charge to determine the first value.

7. The power supply controller of claim 6 wherein the first sense circuit charges the capacitor to a value representing the bridge voltage during a previous cycle and uses the charge stored on the capacitor to determine the first value.

8. A power supply controller comprising:

A switching controller;

a first circuit configured to form a first drive signal responsively to the switching controller to control a first transistor of a half-bridge to regulate a value of an output voltage formed by the power supply controller;

a second circuit configured to form a second drive signal responsively to the switching controller to control a second transistor of the half-bridge;

a first sense circuit configured to receive a bridge voltage formed by the half-bridge and to inhibit driving the first transistor responsively to the bridge voltage having a value that is less than a first value; and a second sense circuit configured to receive the bridge voltage and to inhibit driving the second transistor responsively to the bridge voltage having a value greater than a second value that is less than the first value, the second sense circuit including a JFET coupled to receive the bridge voltage and form a current responsively to the bridge voltage reaching the second value and a diode coupled in series with the JFET.

9. A method of forming a power supply controller comprising:

configuring a power supply controller to form a first drive signal to drive a first transistor of a half-bridge circuit and to form a second drive signal to drive a second transistor of a half-bridge circuit to regulate an output voltage to a desired value wherein a bridge voltage is formed at a common connection of the half-bridge circuit; and configuring the power supply controller to store a first signal representing a first value of the bridge voltage responsively to enabling the first transistor during a first cycle;

configuring the power supply controller to use the first signal to store a second signal that is representative of the first value of the bridge voltage wherein the second signal is stored after disabling the first transistor during the first cycle; and configuring the power supply controller to maintain the stored second signal and inhibit forming the first drive signal during a subsequent cycle until the bridge voltage reaches approximately a value that is representative of the stored second signal.

10. The method of claim 9 further including configuring the power supply controller to inhibit the second drive signal until the bridge voltage reaches approximately a voltage received by a first current carrying electrode of the second transistor.

11. The method of claim 10 wherein configuring the power supply controller to inhibit the second drive signal includes inhibiting the second drive signal until the bridge voltage is approximately equal to a supply return voltage.

12. A method of forming a power supply controller comprising:

configuring the power supply controller to form first and second drive signals to drive first and second transistors of a half-bridge responsively to a switching power supply controller wherein a bridge voltage is formed at a common connection of the half-bridge;

configuring the power supply controller to store a first signal representing a first value of the bridge voltage responsively to enabling the first transistor during a first cycle; and configuring the power supply controller to maintain a value of a signal that is representative of the first value and inhibit forming the first drive signal during a subsequent cycle until the bridge voltage reaches approximately a value of the signal that is representative of the first value.

13. The method of claim 12 wherein configuring the power supply controller to maintain the value of the signal that is representative of the first value and inhibit forming the first drive signal includes configuring the power supply controller to inhibit forming the first drive signal subsequently to terminating the second drive signal.

14. The method of claim 12 wherein configuring the power supply controller to maintain the value of the signal that is representative of the first value and inhibit forming the first drive signal includes configuring a sense circuit to form a sense signal that is used to inhibit the first drive signal until a value of the bridge voltage reaches one of approximately a minimum value or approximately a maximum value.

15. The method of claim 12 further including configuring the power supply controller to inhibit forming the second drive signal responsively to the switching power supply controller until a value of a bridge voltage at a common node of the half-bridge reaches approximately a second value that is less than the first value.

* * * * *